(12) United States Patent
Siegel et al.

(10) Patent No.: US 9,165,198 B2
(45) Date of Patent: Oct. 20, 2015

(54) METHOD FOR IDENTIFYING A VEHICLE DURING VEHICLE-TO-VEHICLE COMMUNICATION

(71) Applicants: AUDI AG, Ingolstadt (DE); VOLKSWAGEN AG, Wolfsburg (DE)

(72) Inventors: Andreas Siegel, Ingolstadt (DE); Hendrik Roessler, Ingolstadt (DE)

(73) Assignees: AUDI AG, Ingolstadt (DE); VOLKSWAGEN AG, Wolfsburg (DE)

( * ) Notice: Subject to any disclaimer, the term of this patent is extended or adjusted under 35 U.S.C. 154(b) by 0 days.

(21) Appl. No.: 14/380,839

(22) PCT Filed: Feb. 1, 2013

(86) PCT No.: PCT/EP2013/000301
§ 371 (c)(1),
(2) Date: Aug. 25, 2014

(87) PCT Pub. No.: WO2013/124033
PCT Pub. Date: Aug. 29, 2013

(65) Prior Publication Data
US 2015/0049940 A1    Feb. 19, 2015

(30) Foreign Application Priority Data
Feb. 25, 2012  (DE) .......... 10 2012 003 776

(51) Int. Cl.
*G06K 9/00*  (2006.01)
*G08G 1/017*  (2006.01)
(Continued)

(52) U.S. Cl.
CPC ........ *G06K 9/00825* (2013.01); *B60R 21/0132* (2013.01); *G06K 9/00805* (2013.01); *G06T 7/408* (2013.01); *G08G 1/0175* (2013.01);
(Continued)

(58) Field of Classification Search
USPC ................ 382/103–105, 108, 165
See application file for complete search history.

(56) References Cited

U.S. PATENT DOCUMENTS 6,853,849 B1  2/2005  Tognazzini
8,362,889 B2  1/2013  Komori
(Continued)

FOREIGN PATENT DOCUMENTS

CN  101632109  1/2010
DE  101 48 289 A1  4/2003
(Continued)

OTHER PUBLICATIONS

Office Action issued Nov. 6, 2012 for corresponding German Patent Application No. 10 2012 003 776.7.
(Continued)

*Primary Examiner* — Duy M Dang
(74) *Attorney, Agent, or Firm* — Staas & Halsey LLP

(57) ABSTRACT

A method identifies a first vehicle during vehicle-to-vehicle communication by the first vehicle emitting vehicle data. A second vehicle receives the emitted vehicle data. The first vehicle is detected by environment data detected with an environment sensor of the second vehicle, and identification of the first vehicle with the second vehicle by the vehicle data and the environment data. The vehicle data comprises at least one information item which relates to a visual property of the first vehicle which can be detected from the outside, and the visual property of the first vehicle which can be detected from the outside is checked by the second vehicle by the environment data for identifying the first vehicle.

17 Claims, 1 Drawing Sheet

US 9,165,198 B2
Page 2

(51) Int. Cl.
*G08G 1/0965* (2006.01)
*B60R 21/0132* (2006.01)
*G06T 7/40* (2006.01)

(52) U.S. Cl.
CPC ..... *G08G1/0965* (2013.01); *B60R 2021/01322* (2013.01); *B60R 2300/804* (2013.01); *G06K 2209/23* (2013.01); *G06T 2207/10024* (2013.01); *G06T 2207/30236* (2013.01)

(56) References Cited

U.S. PATENT DOCUMENTS

| | | |
|---|---|---|
| 2004/0138809 A1 | 7/2004 | Mukaiyama |
| 2005/0267657 A1 | 12/2005 | Devdhar |
| 2007/0188348 A1 | 8/2007 | Bauer et al. |
| 2008/0158009 A1 | 7/2008 | Yano et al. |
| 2011/0034201 A1 | 2/2011 | Hamada et al. |
| 2011/0098877 A1 | 4/2011 | Stählin et al. |
| 2012/0038489 A1 | 2/2012 | Goldshmidt |
| 2012/0095641 A1 | 4/2012 | Merk |
| 2012/0268293 A1 | 10/2012 | Stählin et al. |
| 2013/0083991 A1 | 4/2013 | Rodrigues et al. |
| 2013/0136310 A1 | 5/2013 | Hofman et al. |

FOREIGN PATENT DOCUMENTS

| | | |
|---|---|---|
| DE | 103 56 500 | 7/2004 |
| DE | 10 2007 007 283 A1 | 11/2007 |
| DE | 10 2006 055 344 A1 | 5/2008 |
| DE | 10 2007 045 970 A1 | 7/2008 |
| DE | 10 2008 061 304 A1 | 7/2009 |
| DE | 10 2008 013 103 A1 | 9/2009 |
| DE | 10 2009 026 464 A1 | 12/2010 |
| DE | 10 2010 015 686 A1 | 10/2011 |
| DE | 10 2012 003 776.7 | 2/2012 |
| EP | 0810803 | 12/1997 |
| EP | 1 553 542 A2 | 7/2005 |
| WO | 03/001474 | 1/2003 |
| WO | WO 2004/042673 A2 | 5/2004 |
| WO | WO 2007/047476 A2 | 4/2007 |
| WO | WO 2009/109244 A2 | 9/2009 |
| WO | WO 2010/139649 A1 | 12/2010 |
| WO | WO 2011/163579 A1 | 12/2011 |
| WO | WO 2012/017436 A1 | 2/2012 |
| WO | PCT/EP2013/000301 | 2/2013 |

OTHER PUBLICATIONS

Decision to Grant issued Mar. 21, 2013 for corresponding German Patent Application No. 10 2012 003 776.7.

International Search Report mailed May 7, 2013 for corresponding International Patent Application No. PCT/EP2013/000301.

WIPO provided English translation of the International Preliminary Report on Patentability published Aug. 25, 2014 for corresponding International Patent Application No. PCT/EP2013/000301.

Chinese Office Action for related Chinese Patent Application No. 201380010846.7, issued on Jun. 26, 2015, 15 pages.

METHOD FOR IDENTIFYING A VEHICLE DURING VEHICLE-TO-VEHICLE COMMUNICATION

CROSS REFERENCE TO RELATED APPLICATIONS

This application is based on and hereby claims priority to International Application No. PCT/EP2013/000301 filed on Feb. 1, 2013 and German Application No. 10 2012 003 776.7 filed on Feb. 25, 2012, the contents of which are hereby incorporated by reference.

BACKGROUND

The present invention relates to a method for identifying a first vehicle during vehicle-to-vehicle communication. Moreover, the present invention relates to a vehicle.

Vehicle-to-vehicle communication, which is also referred to as car-to-car communication, makes it possible to interchange information and data between at least two vehicles. Said information and data are interchanged here via radio, for example via WLAN or UMTS. In addition to interchanging data, vehicle-to-vehicle communication is intended to be used to report critical and dangerous situations to a vehicle driver in good time. During vehicle-to-vehicle communication, each vehicle cyclically emits information relating to itself, with the result that other vehicles in the environment can use this information and can accordingly adapt active safety systems, for example in the event of an impending accident.

In this case, the vehicle data emitted by the corresponding vehicles may comprise an item of information relating to their position and their speed determined using a GPS-based positioning system of the vehicle. In this case, the problem is the limited accuracy of the GPS-based positioning and therefore also the determination of the position of the transmitting vehicle relative to the receiving vehicle. A known method for improving this position determination provides for the information from vehicle-to-vehicle communication to be assigned to the objects of the environment sensor system of the vehicle. For this purpose, the position relative to the receiving vehicle is calculated from the emitted GPS position of the transmitting vehicle and, together with an item of speed and travel direction information, is associated with the environment data acquired by the environment sensor. The data transmitted using vehicle-to-vehicle communication are therefore assigned to the environment data in order to identify the transmitting vehicle. However, if the information from the GPS-based positioning is relatively inaccurate, for example on account of shading in the inner-city area, and a plurality of environment objects come into question for the assignment as a result, reliable assignment cannot be ensured.

DE 10 2010 015 686 A1 describes car-to-car communication which is used to transmit measurement data from environment sensors of one motor vehicle to another motor vehicle so that it can react to the obstacles detected by the environment sensors of the other motor vehicle.

EP 1 553 542 A2 describes the use of an information network to interchange data between vehicles, in which driver state information is interchanged between the vehicles. This driver state information may concern information relating to the driver's attentiveness or tiredness. The current position and the speed of the vehicle are likewise transmitted. In addition, provision is made for technical data relating to the vehicle to also be transmitted.

Furthermore, DE 10 2009 026 464 A1 describes a method for providing vehicle-to-vehicle communication between a first-party vehicle and at least one third-party vehicle, a unique vehicle identification address being assigned to each of the vehicles. The first-party vehicle can identify the third-party vehicles using this vehicle identification address and an object detection device of the first-party vehicle.

Finally, DE 10 2007 045 970 A1 describes a vehicle communication device which is intended to be used to avoid dangerous situations which arise, for example, if a vehicle driver selects a vehicle to which he wishes to send a message. In this case, provision is also made for the license plates of third-party vehicles to be recorded using a video camera of the first-party vehicle and for the third-party vehicles to be identified using the license plate. Provision is also made for corresponding information which transmits the current position, the speed and the type of the vehicle, that is to say whether it is a vehicle with large dimensions or a vehicle with standard dimensions, to be transmitted in addition to the messages.

SUMMARY

One possible object is to show a way of being able to identify a vehicle in a particularly simple and reliable manner during vehicle-to-vehicle communication. Moreover, a corresponding vehicle is intended to be provided.

The inventors propose a method for identifying a first vehicle during vehicle-to-vehicle communication comprises at least one first vehicle emitting vehicle data, a second vehicle receiving the emitted vehicle data, the at least one first vehicle being detected using environment data acquired using an environment sensor of the second vehicle, and the at least one first vehicle being identified with the second vehicle using the vehicle data and the environment data, the vehicle data comprising at least one item of information which relates to an optical property of the at least one first vehicle which can be detected from the outside, and the optical property of the at least one first vehicle which can be detected from the outside being checked by the second vehicle using the environment data for identifying the at least one first vehicle.

During vehicle-to-vehicle communication or car-to-car communication, at least one first vehicle or a third-party vehicle emits vehicle data. These vehicle data usually comprise information relating to the current position, the speed and the travel direction of the at least one third-party vehicle. This information may originate from a satellite-based positioning system, for example GPS. The emitted data are acquired by a second vehicle or the first-party vehicle. The second vehicle additionally detects the environment of the second vehicle using at least one environment sensor and obtains corresponding environment data thereby. A transmitting third-party vehicle can be detected or identified in the environment of the first vehicle using these environment data and the received vehicle data. In addition, the vehicle data are intended to comprise at least one item of information which relates to an optical property of the third-party vehicle which can be detected from the outside. These optical properties which can be detected from the outside are intended to provide, in particular, a more accurate item of information relating to the outer shell of the vehicle than would be possible by an item of information relating to the dimensions of the third-party vehicle. The optical properties which can be detected from the outside and concern, in particular, an exterior or the outer surfaces of the third-party vehicle are now detected using the environment sensor of the first-party vehicle. The data acquired using the environment sensor are then compared with the received vehicle data. If the vehicle data correspond to the environment data, the third-party vehicle can be unambiguously identified or assigned by the first-party vehicle. Particularly exact identification of a vehicle during vehicle-to-vehicle communication can therefore be enabled in a simple manner.

In one embodiment, a color value relating to a color of at least one outer surface of the at least one first vehicle is emitted as the at least one item of information which relates to an optical property of the at least one first vehicle which can be detected from the outside. Such a color value may relate to the color of the paint of the vehicle. The color of corresponding outer parts or outer surfaces of the vehicle may likewise be taken into account here. The third-party vehicle can therefore be assigned or identified in a particularly precise manner on the basis of the color value.

In one refinement, a contour value relating to a contour of at least one outer surface of the at least one first vehicle is emitted as the at least one item of information which relates to an optical property of the at least one first vehicle which can be detected from the outside. Such a contour value may include corresponding information relating to the course or geometrical shape of the contours of the outer surfaces of the vehicle. In particular, it is possible to take into account the contours or object contours of the vehicle which clearly distinguish it from other vehicles. This contour value may relate, for example, to a front area, the shape of the radiator grille, the configuration of the headlights or a rear area of the vehicle. It is therefore possible to clearly distinguish whether a sedan, a station wagon, an all-terrain vehicle, a coupe, a cabriolet or the like is involved, for example. The vehicles can be clearly distinguished and therefore reliably identified by the first-party vehicle using the contour.

In another embodiment, a reflection value relating to a reflectance of at least one outer surface of the at least one first vehicle is emitted as the at least one item of information which relates to an optical property of the at least one first vehicle which can be detected from the outside. Such a reflection value may relate to the optical properties of the paint of the vehicle. The reflection value may likewise relate to the other outer surfaces of the vehicle. For example, it is possible to distinguish whether glossy metal surfaces and/or matte plastic areas are present on an outer surface. The third-party vehicle can therefore be easily and reliably assigned using the optical properties of the corresponding areas of the outer shell.

The vehicle data preferably additionally comprise an item of information from at least one identification element of the at least one first vehicle, and this information is checked by the second vehicle using the environment data for identifying the at least one first vehicle. Such an identification element may be formed, for example, by the license plate of the at least one first vehicle. An item of information relating to the license plate—possibly only an item of information relating to a checksum of the license plate for data protection reasons—can therefore be transmitted from the third-party vehicle to the first-party vehicle. The first-party vehicle records the license plate of the third-party vehicle using its environment sensor. The first-party vehicle can unambiguously identify or detect the third-party vehicle using the environment data and the vehicle data received from the third-party vehicle. Instead of the license plate, it is also possible to provide identification elements which are specifically designed for this purpose and are arranged, for example, on the outer surface of the vehicle. This can be enabled by a corresponding sticker. Other objects which are used to unambiguously identify the vehicle are also conceivable here.

Vehicle-to-vehicle communication is preferably carried out between the at least one first vehicle and the second vehicle on the basis of the identification of the at least one first vehicle. If the third-party vehicle—as described above—is unambiguously detected or identified, vehicle-to-vehicle communication can be accordingly adapted. For example, it is possible to clearly determine which third-party vehicle is currently transmitting data and information to the first-party vehicle. The data and information transmitted by the first-party vehicle can likewise be accurately transmitted to an identified third-party vehicle. This makes it possible to make vehicle-to-vehicle communication easier and more reliable.

In one preferred embodiment, a driver assistance system of the second vehicle is controlled on the basis of the identification of the at least one first vehicle. In addition to identifying the third-party vehicle, the position of the third-party vehicle can also be determined in a more accurate manner using the described method. This information can be used to accordingly control a driver assistance system of the first-party vehicle. For example, a driver assistance system in the form of a braking assistant, a distance assistant, a lane change assistant or the like can be controlled in a particularly precise and reliable manner.

The inventors also propose a vehicle comprising a receiving device for receiving vehicle data emitted at least by a further vehicle, an environment sensor for detecting the at least one further vehicle using its environment data, and a computing device which is coupled to the receiving device and to the environment sensor and is intended to identify the at least one further vehicle using the vehicle data and the environment data, the receiving device being designed to receive vehicle data comprising at least one item of information which relates to an optical property of the at least one further vehicle which can be detected from the outside, and the vehicle comprising a checking device which is designed which relates to the optical property of the at least one further vehicle which can be detected from the outside and the vehicle comprising a checking device which is designed to check the optical property of the at least one further vehicle which can be detected from the outside from the vehicle using the environment data for identifying the at least one further vehicle.

The vehicle preferably comprises a storage device which stores vehicle data comprising at least one item of information which relates to an optical property of the vehicle which can be detected from the outside, and a transmitting device which is designed to emit the vehicle data. The previously described information comprising an item of information relating to an optical property of the vehicle which can be detected from the outside can already be stored in a corresponding storage device during production of the vehicle. This storage device can also be designed to be able to store corresponding information even after the vehicle has been produced. This is advantageous, for example, if a change is made to the outer surface of the vehicle. The vehicle therefore comprises a corresponding transmitting device and a receiving device and can therefore participate in vehicle-to-vehicle communication. In this case, it can receive corresponding information comprising an optical property of the vehicle which can be detected from the outside from other vehicles, and the information relating to the first-party vehicle can be emitted.

The vehicle preferably comprises a video camera as the environment sensor. A video camera can be used to determine the properties of the at least one first vehicle or of the at least one third-party vehicle which can be optically detected from the outside in a particularly precise manner.

The advantages and developments described above in connection with the proposed method can be applied in the same manner to the proposed vehicle.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
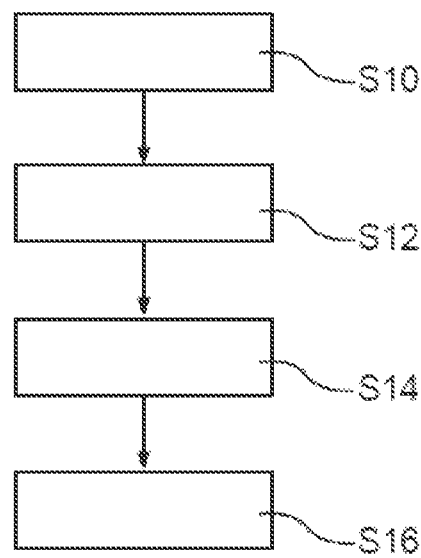
FIG. 1 shows a schematic flowchart of the proposed method.

Reference will now be made in detail to the preferred embodiments of the present invention, examples of which are illustrated in the accompanying drawings, wherein like reference numerals refer to like elements throughout.

The exemplary embodiments described in more detail below are preferred embodiments.

FIG. 1 illustrates a schematic flowchart of the proposed method for identifying a first vehicle during vehicle-to-vehicle communication. In this case, the at least one first vehicle or the third-party vehicle emits vehicle data in a step S10. These vehicle data comprise an item of information relating to the position, the speed and/or the travel direction of the first vehicle. Provision is additionally made for the vehicle data to comprise at least one item of information which relates to an optical property of the at least one first vehicle which can be detected from the outside. Such an optical property which can be detected from the outside may be, for example, a color of at least one outer surface of the vehicle. For example, the color of the paint may thus be taken into account. The color of corresponding outer parts or parts of the outer shell of the vehicle may be taken into account in the same manner. A contour of at least one outer surface of the vehicle may also be taken into account as an optical property which can be detected from the outside. Furthermore, the reflectance of at least one outer surface of the vehicle can be taken into account as an optical property which can be detected from the outside.

The vehicle data emitted by the at least one first vehicle are transmitted, during vehicle-to-vehicle communication, via a radio network, for example WLAN or UMTS. In a further step S12, these emitted vehicle data are received by a second vehicle or the first-party vehicle.

In a step S14, the second vehicle detects the environment of the second vehicle using its environment sensor in order to obtain corresponding environment data. In this case, the second vehicle or the first-party vehicle can preferably detect the environment using a video camera. Other field sensors, for example radar sensors, lidar sensors or the like, are also likewise conceivable. The second vehicle can also detect the at least one first vehicle in its environment using its environment sensor. In this case, the environment sensor, in particular the video camera, is intended to be used to accurately detect the optical properties of the at least one first vehicle which can be detected from the outside, are also emitted by the at least one first vehicle and are received by the second vehicle. For example, the environment sensor can be used to detect the color, the contour and/or the reflectance of at least one outer surface of the at least one first vehicle.

In a step S16, the at least one first vehicle is identified with the second vehicle using the received vehicle data and the environment data. For this purpose, the vehicle data comprising corresponding information which relates to an optical property of the third-party vehicle which can be detected from the outside is received with the second vehicle or the first-party vehicle in the second vehicle or in the first-party vehicle. These vehicle data are compared with the data acquired with the first-party vehicle using the environment sensor. The at least one third-party vehicle can be identified in a particularly accurate manner using the information relating to the position, the speed and the travel direction of the third-party vehicle and by additionally comparing the vehicle data and the environment data which provide information on the exterior or the outer shell of the vehicle.

Figure 2:
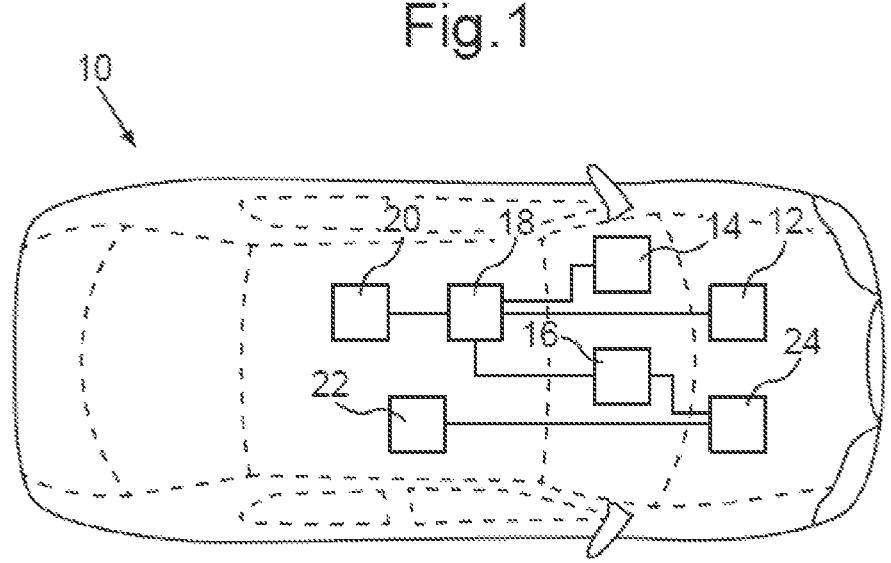
FIG. 2 shows a schematic illustration of the proposed motor vehicle.

FIG. 2 shows a schematic illustration of a plan view of a vehicle 10. The vehicle 10 comprises a receiving device 12 which is designed to receive the vehicle data emitted by at least one further vehicle. The vehicle 10 also comprises an environment sensor 14 which can be used to detect the environment of the vehicle 10. The environment sensor 14 is in the form of a camera or video camera, in particular. The environment sensor 14 is designed to detect at least one further third-party vehicle in the environment of the vehicle 10. Moreover, the vehicle 10 comprises a computing device 18 which is coupled to the receiving device 12 and to the environment sensor 14. For this purpose, the computing device 18 is connected to the receiving device 12 and to the environment sensor 14 via a corresponding data line. The computing device 18 is designed to identify at least one third-party vehicle using the vehicle data transmitted to it by the receiving device 12 and using the environment data transmitted to it by the environment sensor 14.

Moreover, the receiving device 12 is designed to receive vehicle data comprising at least one item of information which relates to an optical property of the at least one further vehicle which can be detected from the outside. Moreover, the vehicle 10 comprises a checking device 20 which is coupled to the computing device 18. The checking device 20 is designed to identify an optical property of the at least one further vehicle which can be detected from the outside using the environment data. For this purpose, the vehicle data from the receiving device 12 and the environment data from the environment sensor 14 are compared using the checking device 20. If the vehicle data and the environment data, each relating to an optical property of the vehicle shell which can be detected from the outside, match, at least one third-party vehicle can be unambiguously identified. The checking device 20 may also be directly connected to the receiving device 12 and to the environment sensor 14 via a corresponding data line.

The vehicle 10 also comprises a positioning device 16 which is assigned to a satellite-based positioning system, for example. The positioning device 16 is connected to the computing device 18. Information relating to the position, speed and travel direction of the vehicle 10 can therefore be additionally compared, in the computing device 18, with the information which relates to the position and the speed of at least one third-party vehicle and is received using the receiving device 12. The positioning device 16 is also coupled to a transmitting device 24. This transmitting device 24 is in turn connected to a storage device 22. The storage device 22 stores data comprising information which relates to at least one property of the vehicle 10 which can be optically detected from the outside. The transmitting unit 22 can therefore be used to emit vehicle data comprising information relating to the current position and the speed and additionally information relating to a property of the vehicle 10 which can be at least optically detected.

The vehicle 10 therefore comprises a receiving device 12 and a transmitting device 24 and is therefore designed to participate in vehicle-to-vehicle communication. The third-party vehicles can be provided with more accurate information relating to the first-party vehicle 10 as a result of the additional information relating to at least one optical property of the vehicle 10 which can be detected from the outside. Information relating to the optical properties of the third-party vehicles which can be detected from the outside may likewise be received with the vehicle 10 via the receiving device 12, and the third-party vehicles can therefore be identified in a particularly reliable manner.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV*, 69 USPQ2d 1865 (Fed. Cir. 2004).

The invention claimed is:

1. A method for identifying a first vehicle during vehicle-to-vehicle communication, comprising:
   receiving vehicle data from the first vehicle the vehicle data comprising information which relates to an optical property of the first vehicle which can be detected from outside the first vehicle, the optical property comprising a reflection value relating to a reflectance of an outer surface of the first vehicle, the vehicle data being received at a receiving device of a second vehicle;
   acquiring environment data of the first vehicle using an environment sensor of the second vehicle; and
   identifying the first vehicle with a computing device of the second vehicle, which is coupled to the receiving device and to the environment sensor, using the vehicle data and the environment data, the first vehicle being identified by checking the optical property by a checking device of the second vehicle using the environment data.

2. The method as claimed in claim 1, wherein the optical property further comprises a color value relating to a color of an outer surface of the first vehicle, and the color of the outer surface of the first vehicle can be detected from outside the first vehicle.

3. The method as claimed in claim 1, wherein the optical property further comprises a contour value relating to a contour of the first vehicle, and the contour of the first vehicle can be detected from outside the first vehicle.

4. The method as claimed in claim 1, wherein the vehicle data further comprises identification information from an identification element of the first vehicle, and the identification information is checked by the second vehicle using the environment data for identifying the first vehicle.

5. The method as claimed in claim 4, wherein the identification information comprises license plate information.

6. The method as claimed in claim 1, wherein vehicle-to-vehicle communication between the first vehicle and the second vehicle is adapted if the first vehicle has been identified.

7. The method as claimed in claim 1, wherein a driver assistance system of the second vehicle is controlled based on identification of the first vehicle.

8. The method as claimed in claim 7, wherein the vehicle data further comprises location data, the first vehicle is identified and the position of the first vehicle is determined using the vehicle data and the environment data, and the driver assistance system is selected from the group consisting of a braking assistant, a distance assistant and a lane change assistant.

9. The method as claimed in claim 1, wherein the vehicle data further comprises location data, there are a plurality of first vehicles, comprising a target first vehicle and a proximate first vehicle, environment data is acquired for all first vehicles, and the target first vehicle is identified from the plurality of first vehicles using vehicle data and environment data associated with the target first vehicle.

10. The method as claimed in claim 1, wherein the proximate first vehicle is identified from the plurality of first vehicles using vehicle data and environment data associated with the proximate first vehicle.

11. The method as claimed in claim 1, wherein the vehicle data further comprises location data, and the location data comprises position, speed and direction of travel.

12. The method as claimed in claim 1, wherein the vehicle data further comprises location data, the first vehicle is identified and the position of the first vehicle is determined using the vehicle data and the environment data.

13. A computerized vehicle comprising:
   a receiving device to receive vehicle data emitted from a different vehicle, the vehicle data comprising at an item of information which relating to an optical property of the different vehicle which can be detected from outside the different vehicle, the optical property comprising a reflection value relating to a reflectance of an outer surface of the different vehicle;
   an environment sensor to detect environment data for the different vehicle;
   a computing device coupled to the receiving device and to the environment sensor, to identify the different vehicle using the vehicle data and the environment data; and
   a checking device to check the optical property of the different vehicle using the environment data, to identify the different vehicle.

14. The computerized vehicle as claimed in claim 13, further comprising:
   a storage device to store self identification data comprising an optical property of the computerized vehicle which can be detected from outside the computerized vehicle; and
   a transmitter to emit the self identification data.

15. The computerized vehicle as claimed in claim 14, wherein the storage device comprises location data for a rewritable memory that that can rewrite the self identification data with updated identification data.

16. The computerized vehicle as claimed in claim 14, wherein the self identification data comprises location data for the computerized vehicle and information which relates to an optical property of the computerized vehicle which can be detected from outside the computerized vehicle.

17. The computerized vehicle as claimed in claim 13, wherein the environment sensor comprises a video camera.

* * * * *